US011836727B1

(12) United States Patent
Parekh et al.

(10) Patent No.: US 11,836,727 B1
(45) Date of Patent: Dec. 5, 2023

(54) LOCATION BASED TRANSACTION AUTHENTICATION

(71) Applicant: WELLS FARGO BANK, N.A., San Francisco, CA (US)

(72) Inventors: Pankaj Parekh, San Francisco, CA (US); Steve Perez, San Francisco, CA (US); Keith Clithero, Charlotte, NC (US); Daniel Sanford, Charlotte, NC (US); Bill Wurz, San Francisco, CA (US)

(73) Assignee: WELLS FARGO BANK, N.A., San Francisco, CA (US)

( * ) Notice: Subject to any disclaimer, the term of this patent is extended or adjusted under 35 U.S.C. 154(b) by 174 days.

(21) Appl. No.: 17/112,290

(22) Filed: Dec. 4, 2020

(51) Int. Cl.
  *G06Q 20/40* (2012.01)
  *H04L 9/40* (2022.01)
  (Continued)

(52) U.S. Cl.
  CPC ......... *G06Q 20/4015* (2020.05); *G06Q 20/02* (2013.01); *G06Q 20/1085* (2013.01);
  (Continued)

(58) Field of Classification Search
  CPC ........... G06Q 20/4015; G06Q 20/3224; G06Q 20/4012; G06Q 20/405
  (Continued)

(56) References Cited

U.S. PATENT DOCUMENTS

| 6,913,194 B2 | 7/2005 | Suzuki |
| 7,599,847 B2 | 10/2009 | Block et al. |

(Continued)

FOREIGN PATENT DOCUMENTS

| CN | 105723392 A | * | 6/2016 | |
| CN | 110517046 A | * | 11/2019 | ......... G06Q 20/3224 |

(Continued)

OTHER PUBLICATIONS

Marforio, Claudio, et al. "Smartphones as Practical and Secure Location Verification Tokens for Payments." NDSS, vol. 14, pp. 23-26. Feb. 2014. (Year: 2014).*

(Continued)

*Primary Examiner* — Sara C Hamilton
(74) *Attorney, Agent, or Firm* — Foley & Lardner LLP

(57) ABSTRACT

Systems, methods, and apparatuses for authorizing a transaction using location based transaction authentication. The method includes receiving a transaction authorization request for a transaction; determining a location of the transaction; identifying an identity of a user associated with the transaction authorization request; determining a computing device associated with the identified user; determining a location of the determined computing device associated with the identified user; determining a distance between the location of the transaction and the location of the determined computing device; determining that additional authentication is required of the identified user based on the determined distance; prompting the user for additional authentication information; receiving a response including additional information; and, authorizing the transaction based on the additional information matching stored additional authentication information.

18 Claims, 5 Drawing Sheets

(51) Int. Cl.
*G06Q 20/20* (2012.01)
*G06Q 20/02* (2012.01)
*G06Q 40/02* (2023.01)
*G06Q 30/018* (2023.01)
*G06Q 20/32* (2012.01)
*G06Q 20/10* (2012.01)
*G06Q 50/14* (2012.01)
*G06Q 20/06* (2012.01)

(52) U.S. Cl.
CPC ......... *G06Q 20/202* (2013.01); *G06Q 20/204* (2013.01); *G06Q 20/326* (2020.05); *G06Q 20/3223* (2013.01); *G06Q 20/3224* (2013.01); *G06Q 20/3278* (2013.01); *G06Q 20/405* (2013.01); *G06Q 20/4012* (2013.01); *G06Q 20/40145* (2013.01); *G06Q 30/0185* (2013.01); *G06Q 40/02* (2013.01); *H04L 63/00* (2013.01); *H04L 63/107* (2013.01); *G06Q 20/0655* (2013.01); *G06Q 50/14* (2013.01); *G06Q 2220/00* (2013.01)

(58) Field of Classification Search
USPC .......................................................... 705/44
See application file for complete search history.

(56) References Cited

U.S. PATENT DOCUMENTS

| | | | |
|---|---|---|---|
| 8,577,734 B2 | 11/2013 | Treyz et al. | |
| 8,579,192 B1 | 11/2013 | Miller et al. | |
| 8,781,963 B1 | 7/2014 | Feng et al. | |
| 8,831,677 B2 | 9/2014 | Villa-Real | |
| 9,519,903 B2 | 12/2016 | Kannan et al. | |
| 9,569,779 B2 | 2/2017 | Cama et al. | |
| 9,589,230 B1 | 3/2017 | Thiagarajan et al. | |
| 9,754,255 B1* | 9/2017 | Ma | G06Q 20/4014 |
| 9,916,543 B2 | 3/2018 | Block et al. | |
| 10,007,914 B2 | 6/2018 | Cama et al. | |
| 10,142,836 B2 | 11/2018 | Block | |
| 10,204,333 B2 | 2/2019 | Fourez | |
| 10,373,166 B2 | 8/2019 | George | |
| 10,387,849 B2 | 8/2019 | Gordon et al. | |
| 10,417,638 B2 | 9/2019 | Pitz et al. | |
| 10,453,059 B2* | 10/2019 | Lloyd | G06Q 20/4015 |
| 10,504,196 B2 | 12/2019 | Feinberg et al. | |
| 10,565,589 B2 | 2/2020 | Pitz et al. | |
| 10,685,345 B2 | 6/2020 | Hunt | |
| 10,789,585 B2 | 9/2020 | Sanchez et al. | |
| 10,867,300 B2 | 12/2020 | Unnerstall et al. | |
| 10,922,673 B2 | 2/2021 | D'Agostino et al. | |
| 11,132,425 B1* | 9/2021 | Cohen | G06Q 20/4093 |
| 11,157,907 B1* | 10/2021 | Kumar | B64C 39/024 |
| 11,227,325 B1* | 1/2022 | Baral | H04W 4/021 |
| 11,288,675 B1* | 3/2022 | Juarez | G06Q 20/405 |
| 11,308,477 B2* | 4/2022 | Hefetz | G06Q 20/4016 |
| 11,349,879 B1* | 5/2022 | Shahidzadeh | G06Q 20/405 |
| 11,429,980 B1* | 8/2022 | Roth | G06Q 20/425 |
| 11,436,588 B1* | 9/2022 | Roth | G06Q 20/4015 |
| 2009/0012898 A1 | 1/2009 | Sharma et al. | |
| 2011/0137804 A1 | 6/2011 | Peterson | |
| 2012/0209773 A1* | 8/2012 | Ranganathan | G06Q 20/3224 705/44 |
| 2013/0046692 A1 | 2/2013 | Grigg et al. | |
| 2013/0218766 A1 | 8/2013 | Mueller | |
| 2013/0226800 A1* | 8/2013 | Patel | H04L 63/107 705/44 |
| 2013/0268378 A1 | 10/2013 | Yovin | |
| 2013/0275303 A1* | 10/2013 | Fiore | G06Q 20/12 705/44 |
| 2014/0279111 A1 | 9/2014 | Mahaffey et al. | |
| 2014/0279503 A1* | 9/2014 | Bertanzetti | G06Q 20/3221 705/44 |
| 2015/0032621 A1 | 1/2015 | Kar et al. | |
| 2015/0081349 A1 | 3/2015 | Johndrow et al. | |
| 2015/0106268 A1* | 4/2015 | Carroll | H04W 12/126 705/44 |
| 2015/0227934 A1* | 8/2015 | Chauhan | G06Q 20/3224 705/44 |
| 2016/0012445 A1 | 1/2016 | Villa-Real | |
| 2016/0021535 A1 | 1/2016 | Tali et al. | |
| 2016/0063493 A1 | 3/2016 | Howe | |
| 2016/0132851 A1* | 5/2016 | Desai | H04W 12/06 705/21 |
| 2016/0292666 A1* | 10/2016 | Chauhan | G06Q 20/204 |
| 2017/0046708 A1 | 2/2017 | High et al. | |
| 2017/0091764 A1* | 3/2017 | Lloyd | G06Q 20/4015 |
| 2017/0091765 A1* | 3/2017 | Lloyd | G06Q 20/321 |
| 2017/0345006 A1 | 11/2017 | Kohli | |
| 2018/0068309 A1* | 3/2018 | Mahaffey | G06Q 20/20 |
| 2018/0096350 A1 | 4/2018 | Groarke et al. | |
| 2019/0147373 A1 | 5/2019 | Block et al. | |
| 2019/0180200 A9 | 6/2019 | Block et al. | |
| 2019/0378135 A1* | 12/2019 | Lloyd | G06Q 20/4015 |
| 2020/0082401 A1* | 3/2020 | Arora | H04L 63/0876 |
| 2020/0334678 A1* | 10/2020 | Dutt | G06Q 20/4016 |
| 2020/0342423 A1* | 10/2020 | Myren | G06Q 20/047 |
| 2020/0402054 A1* | 12/2020 | Manjunath | G06Q 20/3674 |
| 2020/0410497 A1* | 12/2020 | Turpin | G06Q 20/4014 |
| 2021/0065186 A1 | 3/2021 | Kramme et al. | |
| 2021/0117970 A1* | 4/2021 | Hugh | G06Q 20/4016 |
| 2021/0357940 A1* | 11/2021 | Benkreira | H04W 12/08 |
| 2022/0058651 A1* | 2/2022 | Vittimberga | G06F 16/245 |
| 2022/0067699 A1* | 3/2022 | Wong | G06Q 20/341 |
| 2022/0237602 A1* | 7/2022 | Aaron | G06Q 20/40 |

FOREIGN PATENT DOCUMENTS

| | | | | | |
|---|---|---|---|---|---|
| CN | 112740160 A | * | 4/2021 | ......... | G06Q 20/3224 |
| WO | WO-2011119407 A1 | * | 9/2011 | | |
| WO | WO-2015187505 A1 | * | 12/2015 | | |
| WO | WO-2017031504 A1 | * | 2/2017 | | |
| WO | WO-2017139772 A1 | * | 8/2017 | | |
| WO | WO-2018145195 A1 | * | 8/2018 | ............. | G06Q 20/12 |
| WO | WO-2018175462 A1 | * | 9/2018 | ........... | G06Q 20/202 |
| WO | WO-2018195114 A1 | * | 10/2018 | ......... | G06K 9/00771 |
| WO | WO-2019173828 A1 | * | 9/2019 | ......... | G06Q 20/3224 |

OTHER PUBLICATIONS

Zhang, F.; Kondoro, A.; and Muftic, S. "Location-based authentication and authorization using smart phones." 2012 IEEE 11th International Conference on Trust, Security and Privacy in Computing and Communications. pp. 1285-1292. IEEE. Jun. 2012. ( Year: 2012).*

CBS News. "Visa app will track your location to prevent credit card fraud". CBS Interactive, Inc. Feb. 16, 2015. https://www.cbsnews.com/news/visa-app-will-track-your-location-to-prevent-credit-card-fraud/.

Visa Developer Center. "Avoid mistaken purchase declines while your cardholders are traveling", Visa.com. accessed Apr. 6, 2021. www.developer.visa.com/capabilities/tns#section0.

* cited by examiner

US 11,836,727 B1

LOCATION BASED TRANSACTION AUTHENTICATION

TECHNICAL FIELD

The present disclosure relates to systems and methods for location based transaction authentication.

BACKGROUND

Customers of financial institutions typically must set travel plans prior to travelling out of a home area or country. In some instances in which a customer does not set a travel plan, a customer's own transactions may be marked as fraudulent such that the customer is not able to complete any or certain transactions. In especially negative instances, a customer can be left stranded such that a family member or another person must wire or otherwise transfer them money. Customers who do remember to set travel plans may be able to perform transactions when travelling but must make sure their travel plans are adjusted to cover any changes mid-trip. In areas with bad internet connection or cellular service, this can be challenging and a hassle. As a result, there is a need for a seamless way to process transactions in which a customer does not need to consistently update the financial institution on their location and travel plans.

SUMMARY

One embodiment relates to a computer implemented method for authorizing a transaction. The method includes receiving, by a provider institution computing system, a transaction authorization request for a transaction from a point of sale computing system, the transaction authorization request including transaction information. The method further includes determining, by the provider institution computing system, a location of the transaction based on at least one of the transaction information and the point of sale computing system. The method further includes identifying an identity of a user associated with the transaction authorization request. The method further includes determining, by the provider institution computing system, a computing device associated with the identified user based on cross-referencing the identity of the user to one or more computing devices associated with the identified user. The method further includes based on determining the computing device, determining, by the provider institution computing system, a location of the determined computing device associated with the identified user. The method further includes determining, by the provider institution computing system, a distance between the location of the transaction and the location of the determined computing device. The method further includes determining, by the provider institution computing system, that additional authentication is required of the identified user based on the determined distance. The method further includes prompting, by the provider institution computing system, the user for additional authentication information from at least one of the point of sale computing system or the determined computing device. The method further includes receiving, by the provider institution computing system, a response including additional information from the at least one of the point of sale computing system or the determined computing device. The method further includes authorizing, by the provider institution computing system, the transaction based on the additional information matching stored additional authentication information Another embodiment relates to a location based transaction authentication computing system. The computing system includes a network interface and a processing circuit. The network interface is structured to facilitate data communication with a point of sale computing system and a computing device via a network. The processing circuit includes a processor and a memory and is structured to receive a transaction authorization request for a transaction from the point of sale computing system, the transaction authorization request including transaction information; determine a location of the transaction based on at least one of the transaction information or the point of sale computing system; identify an identity of a user associated with the transaction authorization request; determine the computing device is associated with the user based on cross-referencing the identity of the user to one or more computing devices associated with the identified user; based on determining the computing device, determine a location of the determined computing device associated with the identified user; determine a distance between the location of the transaction and the location of the determined computing device; prompt the user for additional authentication information from the determined computing device; receive additional information from the determined computing device within a predefined period of time based on the prompt; and, based on the response being received within the predefined period of time, authorize the transaction based on the additional information matching stored additional authentication information.

Still another embodiment relates to a non-transitory computer readable medium having computer-executable instructions embodied therein that, when executed by at least one processor of a computing system, cause the computing system to perform operations to authorize a transaction. The operations include receiving a transaction authorization request for a transaction from a point of sale computing system, the transaction authorization request including transaction information; determining a location of the transaction based on at least one of the transaction information or the point of sale computing system; identifying an identity of a user associated with the transaction authorization request; determining a computing device associated with the identified user based on cross-referencing the identity of the user to one or more computing devices linked to the identified user; based on determining the computing device, determining a location of the determined computing device associated with the identified user; determining a distance between the location of the transaction and the location of the determined computing device; prompting the user for additional authentication information from at least one of the point of sale computing system or the determined computing device; receiving a response including additional information from the at least one of the point of sale computing system or the determined computing device; and authorizing the transaction based on the additional information matching stored additional authentication information.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Figure 1:
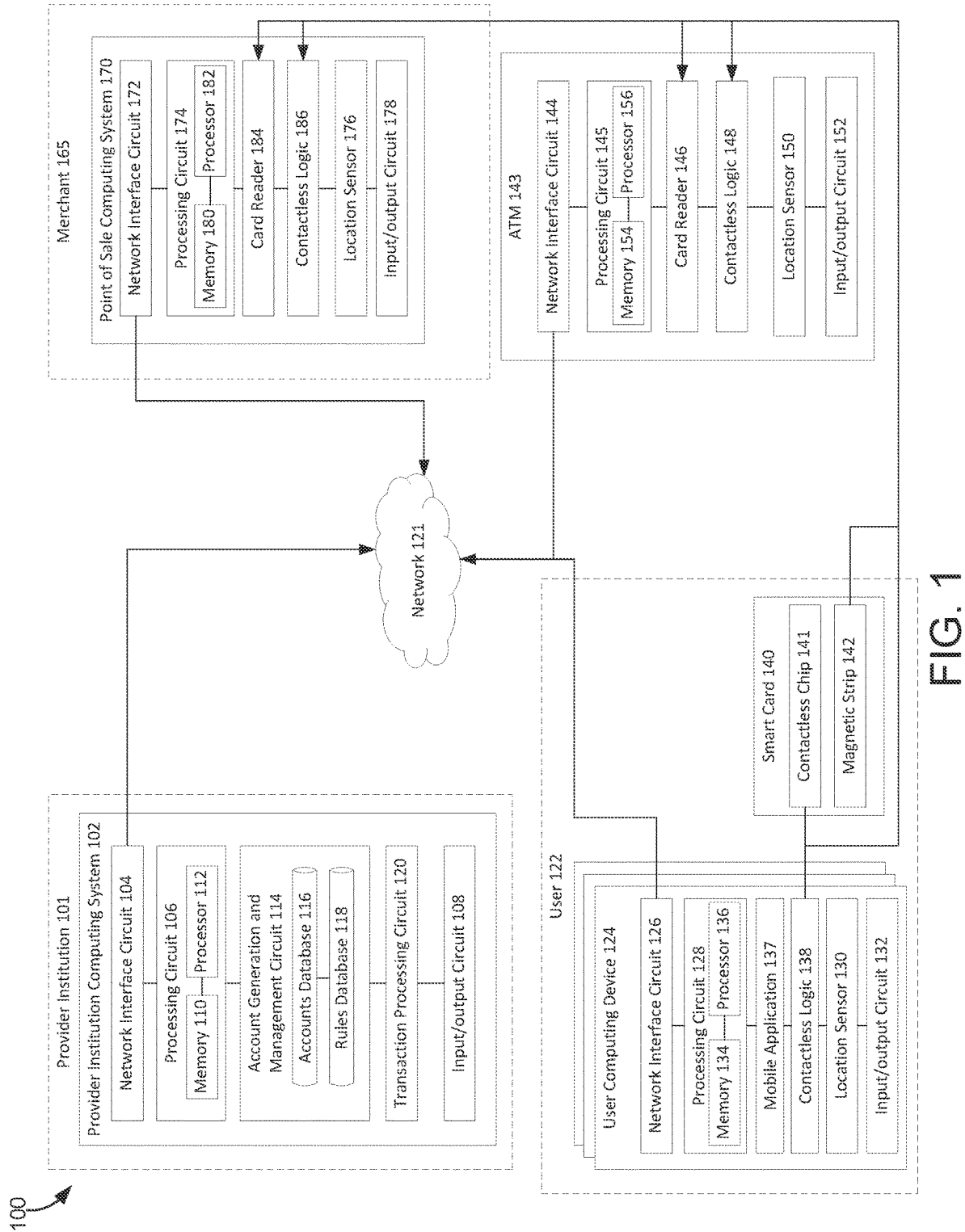
FIG. 1 is a schematic diagram of a location based transaction authentication computing system, according to an example embodiment.

Before turning to the Figures, which illustrate certain example embodiments in detail, it should be understood that the present disclosure is not limited to the details or methodology set forth in the description or illustrated in the figures. It should also be understood that the terminology used herein is for the purpose of description only and should not be regarded as limiting.

Referring generally to the Figures, systems and methods for location based transaction authentication are disclosed. The systems and methods described herein utilize a location of a user's device relative to a determined location of a transaction to authenticate the transaction. In operation, a user may be attempting a transaction at a merchant at Location A. A provider institution computing system receives an indication of a transaction at the merchant at Location A, and transmits a notification to the user's mobile device associated with the user to obtain location information of the user's mobile device. Alternatively, the location of the mobile device may be tracked and a last-know location utilized. Based on the distance between the location of the transaction and the location of the user's mobile device, the provider institution computing system may authorize the transaction, deny the transaction, or determine additional authentication is required. For example, the provider institution computing system may provide a prompt at a merchant point of sale (POS) or an automated teller machine (ATM) for additional authentication of the user prior to the transaction being authorized. Alternatively, the provider institution computing system may provide a prompt to the user's computing device for additional authentication prior to the transaction being authorized. In another example, the provider computing system may provide a prompt on the user's computing device for additional authentication after the transaction has been authorized.

The features described herein provide several technical advantages and benefits. For example, the features described herein allow for manipulation of location data in a unique manner to authenticate a transaction. Because the location data of both the transaction and the user device are used in tandem, less input is required from the user saving on bandwidth and processing power of the user's device. Furthermore, because of the interconnectivity between multiple components, the authentication process is enhanced yet still allows for a transaction in a frictionless way. For example, if the user is travelling, the location of the user's device (which is typically with the user) can be used to authenticate the user and prevent any unnecessary transaction denials. The user does not need to set up any "travel plans" or have concerns that their financial account may be inaccessible because they forgot to set up such a travel plan. This also saves on processing power of the provider institution computing system by resulting in less transactions being flagged for possible fraud.

Referring now to FIG. 1, a schematic diagram of a location based transaction authentication computing system 100 for authenticating and authorizing transactions of a user 122 at, for example, a point of sale computing system 170 or an automated teller machine (ATM) 143 is depicted. The location based transaction authentication computing system 100 includes a provider institution computing system 102 associated with a provider institution 101, one or more user computing devices 124 associated with a user 122, a smart card 140 associated with the user 122, the ATM 143 that may or may not be associated with the provider institution 101, and the point of sale computing system 170 that is associated with a merchant 165. The provider institution computing system 102 working in concert with the one or more user computing devices 124, and at least one of the ATM 143 or the point of sale computing system 170 determines the location of the one or more user computing devices 124 of the user 122 as well as a location of a transaction that is taking place. As described herein, the provider institution computing system 102 authenticates and authorizes the transaction based on the determined locations as well as one or more transaction rules that are set by the user 122. Further, the transaction rules may specify one or more types of additional authentication measures (e.g., secondary authentication) for the transaction. The provider institution computing system 102, the one or more user computing devices 124, and at least one of the ATM 143 or the point of sale computing system 170 are in communication with each other by a network 121. The network 121 may include one or more of a local area network, a wide area, a wired network, and/or a combination of wireless and wired networks. Examples of network configurations include the Internet, a cellular network, Wi-Fi, Wi-Max, a proprietary banking network, etc. In some embodiments, the network 121 is or includes a proprietary banking network to provide secure or substantially secure communications The provider institution computing system 102 is owned by, operated or managed by, or otherwise associated with the provider institution 101 which is an entity that provides one or more goods or services. In the example depicted, the provider institution 101 is a financial institution capable of providing one or more financial products and services (e.g., banking (e.g., the providing of various accounts, such as a demand deposit account), lending, money transfers, issuing credit and/or debit cards, wealth management, etc.). Thus, the associated provider institution computing system 102 is structured to provide or otherwise facilitate providing the one or more financial products and services to customers. As such, the provider institution may also be referred to as a financial institution herein that provides financial services to customers. For example, customers can deposit funds into accounts, withdraw funds from accounts, transfer funds between accounts, view account balances, and the like via the provider institution computing system 102. As described herein, the provider institution computing system 102 is structured to support at least some of the functions and services described below.

As shown, the network interface circuit 104 is structured to establish connections with the user computing device 124 and at least one of the ATM 143 or the point of sale computing system 170 by way of the network 121. The network interface circuit 104 includes programming and/or hardware-based components that couple the provider institution computing system 102 to the network 121. For example, the network interface circuit 104 may include any combination of a wireless network transceiver (e.g., a cellular modem, a Bluetooth transceiver, a Wi-Fi transceiver) and/or a wired network transceiver (e.g., an Ethernet transceiver). In some embodiments, the network interface circuit 104 includes the hardware and machine-readable media structured to support communication over multiple channels of data communication (e.g., wireless, Bluetooth, near-field communication, etc.) Further, in some embodiments, the network interface circuit 104 includes cryptography module(s) to establish a secure communication session (e.g., using the IPSec protocol or similar) in which data communicated over the session is encrypted and securely transmitted. To support the features of the provider institution computing system 102, the network interface circuit 104 provides a relatively high-speed link to the network 121, which as described above, may be any combination of a local area network (LAN), an intranet (e.g., a private banking or retailer network), the Internet, or any other suitable communications network, directly or through another interface.

The processing circuit 106, as shown, comprises a memory 110, a processor 112. The memory 110 includes one or more memory devices (e.g., RAM, NVRAM, ROM, Flash Memory, hard disk storage) that store data and/or computer code for facilitating the various processes described herein. That is, in operation and use, the memory 110 stores at least portions of instructions and data for execution by the processor 112 to control the processing circuit 112. The memory 110 may be or include tangible, non-transient volatile memory and/or non-volatile memory. The processor 112 may be implemented as a general-purpose processor, an application specific integrated circuit (ASIC), one or more field programmable gate arrays (FPGAs), a digital signal processor (DSP), a group of processing components, or other suitable electronic processing components.

The input/output circuit 108 is structured to receive communications from and provide communications to the user(s) of the provider institution computing system 102. In this regard, the input/output circuit 108 is structured to exchange data, communications, instructions, etc. with an input/output component of the provider institution computing system 102. Accordingly, in one embodiment, the input/output circuit 108 includes an input/output device, such as a touchscreen. In another embodiment, the input/output circuit 108 includes communication circuitry for facilitating the exchange of data, values, messages, and the like between an input/output device and the components of the provider institution computing system 102. In yet another embodiment, the input/output circuit 108 includes machine-readable media for facilitating the exchange of information between an input/output device and the components of the provider institution computing system 102. In still another embodiment, the input/output circuit 108 includes any combination of hardware components, communication circuitry, and machine-readable media. Hardware components can include a touchscreen, a keypad, microphone, camera, or buttons for receiving user inputs. Components of the input/output circuit 108 display instructions, status notification and other information to the user. The display (e.g., the touchscreen) may be configured to display graphics such as menus, instructions, background photos (e.g., advertisements, etc.), logos, and so on. In one embodiment, the display is a touchscreen display that is capable of detecting user touches, e.g., to make menu selections.

The provider institution computing system 102 may further include an account generation and management circuit 114 and a transaction processing circuit 120. The account generation and management circuit 114 may be configured to receive and provide user account information, generate an account based on the user account information, receive and provide user device information (to be added to the account of the user 122) and receive and provide one or more transaction rules of the user 122. To do so, the account generation and management circuit 114 may include an accounts database 116 and a rules database 118. In use, the accounts database 116 may store details relating to the user 122 (e.g., the user account information) as well as the accounts and details of the accounts (e.g., account information) of the user 122 that are generated by the account generation and management circuit 114. For example, the accounts database 116 may store, retrieve, and receive, user account information such as name, date of birth, card information (e.g., credit or debit card number), device information (e.g., IP address of a user device, phone number of the user device, device type, information available from the device, network address of the device, etc.), and account history (e.g., past transactions). Furthermore, the accounts database 116 may store, retrieve, and receive account information (e.g., account number, payment types (e.g., mobile payment activated, touchless payment, etc.), and account balances) of the user 122. The accounts database 116 may be configured to retrieve and lookup a variety of information relating to the user 122 and therefore provide the information to any one of the components of the provider institution computing system 102. Similarly, the rules database 118 may work in tandem with the accounts database 116 and store, retrieve, and receive information relating to one or more transaction rules of the user 122. For example, the rules database may include transaction rules specifying various situations in which a transaction may be authenticated and in which a transaction may not be authenticated. In this way and as will be discussed further herein, the transaction processing circuit 120 may communicate with and request data from both the accounts database 116 and the rules database 118 to determine if a specific transaction should be authenticated. In some embodiments, the rules database 118 and the accounts database 116 are a single database that performs the function of both.

The transaction processing circuit 120 of the provider institution computing system 102 may be configured to receive one or more authorization requests regarding transaction relating to the account of the user 122, authenticate the user 122, and authorize (i.e., approve) or deny the transactions based on device information (e.g., device location) and the transaction rules of the transaction rules database 118. In this way, the transaction processing circuit 120 may be in communication with the accounts database 116 and the rules database 118 to request one or more sets of information (e.g., device information, transaction rules, user account information, account information, etc.). The transaction processing circuit 120 may be further configured to determine multiple authentication steps based on the transaction rules perform location based authentication based on the one or more computing devices 124 of the user 122 as well as secondary authentication (if the rules specify). For example, a transaction rule within the rules database 118 may be stored that require that the user computing device 124 to within a predefined distance (e.g., 100 feet) of a transaction (e.g., the location of the ATM 143 or the point of sale computing system 170) for any transaction over a predefine value (e.g., $100.) The transaction processing circuit 120 may then receive a transaction authorization request (e.g., from the point of sale computing system 170)

for a transaction over the predefined value (e.g., $356.21). Based on the transaction rule discussed above, the transaction processing circuit 120 may determine the location of the transaction (e.g., via the transaction request itself or via at least one of the ATM 143 and the point of sale computing system 170) as well as the location of the user computing device 124 (e.g., by acquiring the device information of the user 122 from the accounts database 116). If the user computing device 124 is determined to be within the predefined distance of the transaction, the transaction processing circuit 120 may authenticate the user 122 and authorize (assuming the account has sufficient funds) the transaction. If not, the transaction processing circuit 120 may deny the transaction or determine (based on the transaction rule) that secondary authentication is required.

If the transaction processing circuit 120 determines that additional (secondary, third, fourth, fifth, sixth, etc.) authentication is required, the transaction processing circuit 120 may determine based on the respective transaction rule what authentication information is required from the user and a recipient address for where the additional authentication request may be sent. As used herein, the term "recipient address" refers to a physical or digital location to which the additional authentication request may be sent. For example, the user 122 may provide a transaction rule to the rules database 118 that the user computing device 124 must be within a distance range for any transaction over a predefined amount, but if it is not, the recipient address (e.g., an IP address of the point of sale computing system 170) is provided with an additional authentication request requesting authentication information from the transaction processing circuit 120 (e.g., a key code or other passcode of the user 122 to be entered into the point of sale computing system 170 by either the user 122 or the operator of the point of sale computing system 122). In such a situation, the transaction processing circuit 120 may then receive a response to the request which includes additional information which may or may not be verified as matching authentication information user 122. If they match, the transaction processing circuit 120 may authorize the transaction. If not, the transaction processing circuit 120 may deny the transaction or determine even more additional authentication that is required (as defined by the transaction rule). In much the same way, the user 122 may set varying transaction rules relating to more than one of the user computing devices 124. For example, the user 122 may require one of the user computing devices 124 to be within a first predefined distance (e.g., a 100 feet) of the transaction or another of the user computing devices 124 to be within a second, smaller, predefined distance (e.g., 10 feet) on any transaction worth over a predefined value (e.g., $100 or more).

In this way, the provider institution computing system 102, the account generation and management circuit 114, and the transaction processing circuit 120 may receive multiple transaction rules relating to a single account (or multiple accounts), and authorize or deny transactions based on the transaction rules. By doing so, the provider institution computing system 102, the account generation and management circuit 114, and the transaction processing circuit 120 allow the user 122 to customize their transaction rules to best suit themselves and protect their accounts. In one example, a customer who travels a lot may have a relatively relaxed set of transaction rules (e.g., low levels of authentication) with regard to their travelling account (e.g., the account used during travel), but a very tight set of transaction rules (e.g., high levels of authentication) with regard to their non-travelling account (e.g., a particular demand deposit or savings account).

The user 122 may or may not be a customer of the provider institution 101. In one example, the user 122 may be a customer of the provider institution 101 and have one or more accounts with the provider institution 101. In another example, the user 122 may not be a customer of the provider institution 101 and may only have a temporary account or card with the provider institution 101. Furthermore, the user 122 has one or more user computing devices 124 that are associated with the user 122. The user computing devices 124 are configured to provide various pieces of information (e.g., location data/information) over the network 121 to the provider institution computing system 102 (e.g., as discussed above) as well as provide payment information to allow for contactless payment functionality via the computing device 124 (i.e., mobile pay). As a result, the one or more user computing devices 124 may be a mobile phone (e.g., cell phone, smart phone, etc.), a smart watch, a tablet, a laptop, smart glasses, head-mounted display (e.g., a virtual reality display), or any other type of computing/network connected device. In some embodiments, each of the one or more user computing devices 124 may be further configured to perform payments (e.g., via a mobile pay function).

Each of the one or more user computing devices 124 may include a network interface circuit 126, a processing circuit 128, and an input/output circuit 132. The network interface circuit 126 is structured to establish connections with other computing systems and user-interactive devices (e.g., the provider institution computing system 102, other of the user computing devices 124, etc.) by way of the network 121. Accordingly, the network interface circuit 126 enables the user computing device 124 to transmit and/or receive information to and/or from the provider institution computing system 102 and the other of the user computing devices 124. The network interface circuit 126 includes program logic that facilitates connection of the user computing device 124 to the network 152. For example, the network interface circuit 126 may include a combination of a wireless network transceivers (e.g., a cellular modem, a NFC transceiver, a Bluetooth transceiver, a Wi-Fi transceiver, etc.) and/or a wired network transceivers (e.g., an Ethernet transceiver). In some arrangements, the network interface circuit 126 includes the hardware and machine-readable media sufficient to support communication over multiple channels of data communication. Further, in some arrangements, the network interface circuit 126 includes cryptography capabilities to establish a secure or relatively secure communication session in which data communicated over the session is encrypted.

The processing circuit 128 includes a memory 134 and a processor 136. The memory 134 may be one or more devices (e.g., RAM, ROM, Flash memory, hard disk storage) for storing data and/or computer code for completing and/or facilitating the various processes described herein. Memory 134 may be or include non-transient volatile memory, non-volatile memory, and non-transitory computer storage media. Memory 134 may include database components, object code components, script components, or another type of information structure for supporting the various activities and information structures described herein. The memory 134 may be communicably coupled to the processor 136 and include computer code or instructions for executing one or more processes described herein. The processor 136 may be implemented as one or more application specific integrated circuits (ASICs), field programmable gate arrays (FPGAs), a group of processing components, or other suitable electronic processing components. As such, the user computing device 124 is configured to run a variety of application programs and store associated data in a database of the memory 134. One such application may be a mobile application 137 associated with and supported by the provider institution.

The input/output circuit 132 is structured to receive communications from and provide communications to the user 122. In this regard, the input/output circuit 132 is structured to exchange data, communications, instructions, etc. with an input/output component of the user computing device 124. In one embodiment, the input/output circuit 132 includes an input/output device. In another embodiment, the input/output circuit 132 includes communication circuitry for facilitating the exchange of data, values, messages, and the like between an input/output device and the components of the user computing device 124. In yet another embodiment, the input/output circuit 132 includes machine-readable media for facilitating the exchange of information between an input/output device and the components of the user computing device 124. In still another embodiment, the input/output circuit 132 includes a combination of hardware components, communication circuitry, and machine-readable media. For example, in some embodiments, the input/output circuit 132 may include suitable input/output ports and/or an interconnect bus (not shown) for interconnection with a local display (e.g., a touchscreen display) and/or keyboard/mouse devices (when applicable), or the like, serving as a local user interface for programming and/or data entry, retrieval, or manipulation purposes. That is, the input/output circuit 132 provides an interface for the user 122 to interact with various applications (e.g., the mobile application 137) stored on the user computing device 124.

The user computing device 124 further includes a location sensor 130 which may be any type of sensor that is able to determine the location of the user computing device 124. In one example, the location sensor 130 is a global positioning system (GPS) sensor. In another embodiment, the location sensor 130 is local positioning system (LPS) that is configured to communicate with one or more signaling beacons (e.g., cellular station, broadcast tower, Wi-Fi router, etc.) to determine the position of the user computing device 124. In use the location sensor 130 may communicate with the network interface 126, the processing circuit 128, and the input/output circuit 132 to provide location data/information to the provider institution computing system 102. In one example, the location sensor 130 may communicate with the mobile application (e.g., a mobile pay application, or another application related to the banking system of the provider computing device 102) to provide location data relating to the user computing device 124. In another example, the provider institution computing system 102 may communicate with the user computing device 124 over the network 121 to request and receive location data of the user computing device 124 from the location sensor 130. In this way, the location sensor 130 may provide the location of the user computing device 124 to the transaction processing circuit 120 to provide location information that may be used to authenticate one or more transactions relating to the user 122. In other embodiments, the provider institution computing system 102 may request and receive permission from the user 122, via the user computing device 124, prior to receiving the location of the user computing device 124 from the location sensor.

The user computing device 124 includes the mobile application 137 that is provided by and coupled to the provider institution computing system 102. In some arrangements, the mobile application 137 may be a standalone application or be incorporated with an existing application of the user computing device 124 (e.g., integrated into a mobile banking application, a service provider application, etc.). The mobile application 137 may be downloaded by the user computing device 124 prior to its usage, hard coded into the memory 134 of the user computing device 124, or be a network-based or web-based interface application such that the provider institution computing system 102 may provide a web browser to access the application, which may be executed remotely from the user computing device 124. In the latter instance, the user 122 may have to log onto or access the web-based interface before usage of the application 137. In the example shown, the mobile application 137 is downloaded to the user computing device 124 and provided by the provider institution computing system 102 via, for example, an app store for download. In the example shown, the mobile application 137 is structured as a mobile banking application.

The mobile application 137 is configured to be used in combination with a contactless logic 138 as well as the account of the user 122. In use, the mobile application 137 may be launched by the user of the user computing device 124 (e.g., the user 122) to provide payment at a point of sale (e.g., the point of sale computing system 170). In some embodiments, the mobile application 137 may first require authentication (e.g., a password, a pin number, biometric information of the user, etc.). Once launched, the mobile application 137 may work in tandem with the contactless logic 138 to provide payment information of the user 122 to a contactless logic of the ATM 143 or a contactless logic 186 of the point of sale computing system 170. In some embodiments, the contactless logic 138, the contactless logic 148, and the contactless logic 186 may communicate using near field communication (NFC), Bluetooth, or another short-range wireless communication. In use the mobile application 137 and the contactless logic 138 may provide payment information (e.g., account information, card information, authentication information) to the contactless logic 148 or the contactless logic 186 to process a payment or transaction (e.g., provide credential to access the ATM) with little to no contact (e.g., via an NFC tap).

The mobile application 137 may be used to generate and set the transaction rules of the user 122. For example, the user 122 may have a transaction rule that for any transaction over a predefined value (e.g., $50), the user computing device 124 must be within a predefined distance (e.g., 50 feet) of the transaction or the user 122 must authenticate themselves by providing their PIN to the mobile application 137. In this example, the mobile application 137 is the recipient address and the PIN of the user 122 is the additional authentication information. In this way, the mobile application 137 may allow the user 122 to provide additional authentication.

Still referring to the contactless logic 138, the contactless logic 138 can come in many forms but may be a chip that is located within the user computing device 124 that includes logic to perform contactless payments. In another embodiment, the contactless logic 138 is the logic stored within the memory 134 that when executed by the processor 136 causes the input/output circuit 132 to communicate (e.g., via NFC) with a contactless logic of a point of sale computing system. In this way, the contactless logic 138 (and the mobile payments application) allow the user 122 to use the user computing device 124) to make purchases using the account of the user 122.

As shown, the user 122 may have more than one of the user computing devices 124. In one example, the user 122 may have a first user computing device 124 (e.g., cell/smart phone), a second user computing device 124 (e.g., a smart watch), and a third user computing device 124 (e.g., a tablet) which they take when they travel. The user 122 may then set up one or more transaction rules (e.g., via the mobile application 137, via a website of the provider, etc.) relating to one or more of these user computing devices 124. For example, the user 122 may have a transaction rule that transactions having a value over a predefined amount in which a debit/credit card was used to pay needs to have the first user computing device 124 or third user computing device 124 within a predefined distance. Similarly, the types of payment (e.g., a specific debit card, a specific credit card, the smart card 140, etc.) may also be used to provide more customization of the transaction rules.

In addition to the computing devices 124, the user 122 may further have a transaction card, shown as a smart card 140. The smart card 140 (also referred to as a transaction card herein) may be associated with the user (e.g., a credit/debit card associated with a user account). The transaction card 140 may include one or more transaction features, which are shown as a contactless chip 141 and a magnetic strip 142. The contactless chip 141 may be similar to or include contactless logic (similar to the contactless logic 138) such that payment information can be provided and payments can be processed based on a wireless transmission (e.g., NFC) via the contactless chip 141. The smart card 140 may also include a magnetic stripe 140. The magnetic strip 140 may be capable of providing payment information via contact (e.g., via a card reader reading the magnetic stripe or chip 142) to process a payment (e.g., a swipe). The magnetic stripe may have user or payment information encoded therein (e.g., Track 1, Track 2, etc.). The transaction card may also have a chip (e.g., EMV chip) to enable a dipping of the card into card readers. As described herein, the smart card 140 may be associated with the account of the user 122 such that when used, the transaction processing circuit 120 authorizes or denies a transaction initiated by the smart card 140.

Still referring to FIG. 1, the location based transaction authentication computing system 100 is further shown to include the ATM 143. As described herein, the ATM 143 may or may not be associated with the provider institution 101 and is configured to provide ATM transactions, such as cash withdrawals, bill pay, deposits, view balances, etc. In this example, the ATM includes a network interface circuit 144 through which the ATM communicates over the network 121, a processing circuit 145, a card reader 146, the contactless logic 148, a location sensor 150, and an input/output circuit 152. The network interface 144 may be similar to the network interface 126 and the network interface 104. Similarly, the processing circuit 145 may be similar to the processing circuits 106, 128 and may include a memory 154 (which may be similar to the memories 110, 134) and a processor 156 (which may be similar to the processors 112, 136). Furthermore, the input/output circuit 152 may be similar to the input/output circuits 108, 132. Accordingly, it will be understood that the description of the processing circuits 106, 128, the network interface circuits 104, 126 and the input/output circuits 108, 132 provided above may be applied to the processing circuit 145, the network interface circuit 144, and the input/output circuit 152 of the point of the ATM 143, respectfully.

The location sensor 150 may be similar to the location sensor 130 (and therefore the description of the location sensor 130 may be applied to the location sensor 150), but may provide or determine the location of the transaction that is being processed via the ATM 143. In some embodiments, the location sensor 150 may do so by determining the location of the ATM 143 (as discussed herein). In some embodiments, the ATM 143 provides the location information relating to the transaction within the transaction authorization request to the provider institution computing system 102. By doing so, the ATM 143 may reduce the number of communications with the provider institution computing system 102.

The card reader 146 and the contactless logic 148 may further be included to receive payment information. The card reader 146 may interface with and read magnetic debit/credit cards (e.g., of the magnetic stripe/chip 142) to receive payment information from a respective debit/credit card (e.g., the smart card 140). In one example, the user 122 may request a predefined amount of cash to be received from the ATM and the payment information may be received from their debit/credit card. The user 122 may insert their debit/credit card into the card reader 146, which may then read payment information from a magnetic chip or stripe of the card. The network interface circuit 144 may then provide the payment information and the transaction information to the provider institution computing system 102 and request the provider institution computing system 102 to authorize the request for the funds. Similarly, the same transaction may take place using the contactless logic 148 (which may be the same or similar to the contactless logic 138).

The point of sale computing system 170 is associated with the merchant 165 and is configured to allow for the purchase of goods and services by generating transaction information (e.g., date of transaction, location of transaction, price of transaction, tax information, goods/services provided, etc.) and processing payments of the user 122 relating to the sale. To do so, the point of sale computing system 170 may communicate over the network 121 with the provider institution computing system 102 (e.g., as discussed above) and other systems (payment rail, acquirer computing system, etc.). To perform payments and generate sales information, the point of sale computing system 170 may be a variety of computing system types (e.g., mobile device with a card reader, laptop with card reader, a POS specific computing system, a cash register, etc.). The point of sale computing system 170 may include a network interface circuit 172, a processing circuit 174, a location sensor 176, an input/output circuit 178, a card reader 184, and the contactless logic 186. The network interface circuit 172, the processing circuits 174, and the input/output circuit 178 may function substantially similar to and include the same or similar components as the network interface circuit 104, the processing circuit 106, and the input/output circuit 108 described above, with reference to the provider institution computing system 102. Accordingly, it will be understood that the description of the processing circuit 106, the network interface circuit 104, and the input/output circuit 108 provided above may be applied to the processing circuit 174, the network interface circuit 172, and the input/output circuit 178 of the point of sale computing system 170.

The location sensor 176 may be similar to the location sensor 130 (and therefore the description of the location sensor 130 may be applied to the location sensor 176), but may provide or determine the location of the transaction that is being performed at the point of sale computing system 170. In some embodiments, the location sensor 176 may do so by determining the location of the point of sale computing system 170 (as discussed herein). In other embodiments, the location sensor 176 may determine a location of the transaction that is being processed via the point of sale computing system 170 (e.g., via an IP address, via received payment information, etc.). In this way, the point of sale computing system 170 may be able to determine the location of online or external transactions (i.e., transaction that do not physically take place at the point of sale computing system 170). The transaction location may then be provided to the provider institution computing system 102 via the network 121 for authentication of one or more transactions. In some embodiments, the point of sale computing system 170 provides the location information relating to the transaction within the transaction authorization request to the provider institution computing system 102. By doing so, point of sale computing system 170 may reduce the number of communications with the provider institution computing system 102. In another embodiment, the point of sale computing system 170 may not include the location sensor 176 and may be programmed on site with the location of the point of sale computing system 170. In even other embodiments, the location of the point of sale computing system 170 can be determined from an IP address of the point of sale computing system 170.

The processing circuit 174 may be configured to generate transaction information, receive payment information, and process transactions by communicating with the provider institution computing system 102. To do so, the processing circuit 174 may interface with the card reader 184 and the contactless logic 186. The card reader 184 may interface with and read debit/credit cards (e.g., the magnetic strip 142 of the smart card 140) to receive payment information from the respective debit/credit card. The processing circuit 174 may provide the payment information and the transaction information to the provider institution computing system 102 and request the provider institution computing system 102 to authorize the request for funds from the account of the user 122. Similarly, the same transaction may take place using the contactless logic 186 (which may be the same or similar to the contactless logic 138).

The transaction rules specified by the user 122 and stored within the rules database 118 may further be specific to the interface that is conducting the transaction. For example, the transaction rules may state that additional authentication must be via the user computing device 124 if the transaction takes place via the point of sale computing system 170, but that the additional authentication may be via either the user computing device 124 or the input/output circuit 152 if the transaction takes place through the ATM 143. By doing so, the provider institution 101 may only allow secure information to be received via their devices and not via a third party device (e.g., the point of sale computing system 170). This may provide for more secure transactions in which there is a lesser chance of the user's additional authentication or payment information being stolen.

Figure 2:
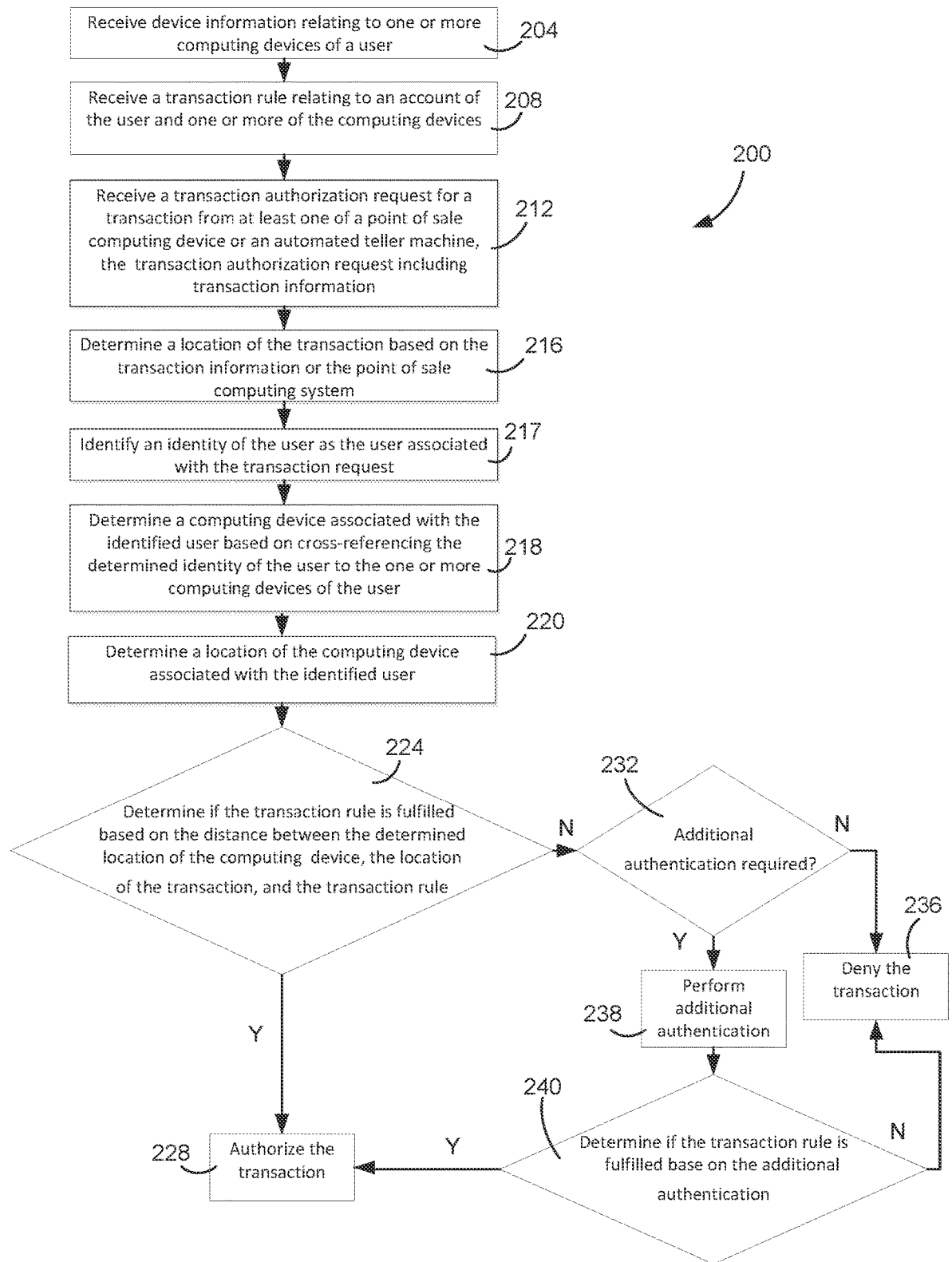
FIG. 2 is flow diagram of a method for authorizing a transaction using location based transaction authentication, according to an example embodiment

Referring now to FIG. 2, a flow diagram of method 200 for authenticating a transaction is shown, according to an example embodiment. Operations of the method 200 may be performed by the location based transaction authentication computing system 100 (e.g., the processor 112 of the provider institution computing system 102). As described herein "location based transaction authentication" refers to utilizing the location of one or more of the computing devices 124 of the user 122 as well as the location of a transaction (e.g., the location of the POS computing system 170, the location of the ATM 140, etc.) to authenticate the user and authorize the transaction. In some embodiments, the method 200 and the location based transaction authentication may be initially triggered by the use of the smart card 140 associated with the user 122. For example, the use of the smart card 140 at the POS computing system 170 or the ATM 140 may act as the initial trigger or beginning step of the method 200. In other embodiments, the location based transaction authentication or the method 200 may be initiated by device to device payments (e.g., from the user computing device 124 to another computing device or vice versa) or via payments from the user computing device 124 to the ATM 140 or the POS computing system 170.

At process 204, the provider institution computing system 102 receives device information regarding one or more mobile computing devices of the user 122. In some embodiments, the device information may be received along with other user 122 information during an account generation process (e.g., when the user 122 opens a new bank account related to the provider institution 101). Different sets of the device information may be received over time as the user 122 removes and adds new devices to an existing account. For example, the user 122 may purchase the user computing device 124, install a pay application (e.g., the mobile application 137) on the user computing device 124, and register the user computing device 12 as the preferred device of the user 122 (i.e., provide the device information to the provider institution computing system 102 to be stored along with the account information of the user 122 in the accounts database 116). As a result, the provider institution computing system 102 and the accounts database 116 may receive multiple sets of device information, each set relating to a single computing device of the user 122. Once received, the user 122 may be able to manage the information (e.g., add more device information, remove old device information, etc.). In this way, the provider institution computing system 102 may have the most recent and up to date information regarding the multiple mobile computing devices used by the user 122 (e.g., the one or more user computing devices 124). In some embodiments, each set of device information may be received or be required to be received from the user computing device 124 that the information relates to. In this way, the provider institution computing system 102 may require the device information to be authenticated by the device itself (e.g., via a one-use code or key that is texted to the device, via the mobile pay application, via email, etc.).

Once the provider institution computing system 102 has received the device information relating to one or more mobile computing devices of the user 122, the method 200 proceeds to step 208 at which one or more transaction rules relating to an account of the user 122 are received. Each transaction rule may define a location boundary relating to a single computing device relative to a determined transaction location (e.g., the ATM 140 location or POS computing system 170 location). Each transaction rule may vary in how the rule is enforced. For example, the transaction rule may provide for automatic authentication, automatic denial, or additional (i.e., secondary) authentication that may be required. In one embodiment, each transaction rule may provide a distance range between a location of the user computing device 124 and a transaction in which all transactions are authorized, in which all transactions are denied, and in which additional authentication is required. For example, a transaction rule may require all transactions to have the user computing device 124 within a predefined first distance (e.g., 20 miles) (or be denied) and all transactions to have the user computing device 124 within a second, smaller, predefined distance (e.g., 10 miles) or require secondary authentication of the user 122 (e.g., biometric information provided via any device of the user 122 to the provider institution computing system 102 within 30 minutes of the transaction). In this example, transactions within the second predefined distance (e.g., 10 miles of the user computing device 124) are authenticated and authorized (assuming the user 122 has the funds to process the transaction), transactions between the first predefined distance and the second predefined distance (e.g., 10-20 miles of the user computing device 124) require additional authentication, and all transactions over the first predefined distance (e.g., over 20 miles away from the user computing device 124) are denied.

In some embodiments, each transaction rule may include a first distance range between a transaction location and the user computing device 124 in which all or mostly all transactions are authenticated and authorized (assuming the account of the user 122 associated with the transaction rule has sufficient funds) and a second distance range between a transaction location and the user computing device 124 in which transactions are denied. Each transaction rule may further include an optional third distance range between a transaction location and the user computing device 124 in which transactions require secondary authentication, an optional fourth distance range between a transaction location and the user computing device 124 in which transactions require secondary and third level authentication, etc. By doing so, each transaction rule may better allow the user 122 to customize the distance ranges (from the user computing device 124's location to the transaction location) in which they want transactions approved, denied, or additional authentication to be required.

In some embodiments, each transaction rule may further include a trigger or location based authentication requirement. As described herein, the location based authentication "requirement" refers to utilizing one or more parameters of the transaction (e.g., the value of the transaction, the time of the transaction, the date of the transaction, the account used to process the transaction, etc.) or the location of the user computing device 124 relative to a transaction location to initiate location based transaction authentication to authorize the transaction. For example, as discussed herein, the user 122 may specify that location based authentication only takes place on transactions involving amounts greater than or equal to a specified value (e.g., $100) (an amount parameter). Other parameters include a time or time range, date or date range, a specific location (e.g., a geographical fence as described herein), a specific transaction device (e.g., the ATM 143 or the point of sale computing system 170, etc.), a category of purchase (e.g., based on a merchant code for items, such as household goods), and so on. These parameters may define when the location based authentication process described herein may be utilized. For example, when the user dips the smart card in a POS during a certain date range and with a predefined merchant category, based on this certain date range and merchant category matching predefined categories, the location based authentication requirement is met such that the location based authentication is triggered.

In regard to a specific location to trigger the location based authentication, a transaction rule may further include a geographical fence or zone (geofence) requirement such that the device location and the transaction location are required to be used to authorize the transaction when a transaction takes place outside of (or alternatively inside of) the geofence. For example, the user 122 may set a geofence for a "home area" (e.g., a city limits, a metropolitan area limits, a hand drawn geofence, etc.) inside which transactions do not require location based authentication but outside of which transactions require location based authentication as discussed herein. In such an example, the provider institution computing system 102 may receive a transaction that is determined to be (e.g., from the transaction information or from the transaction location) outside of the geofence (e.g., the "home area."). Then, based on the transaction rule, the provider institution computing system 102 may request or determine the location of the user computing device 124 and perform location based transaction authentication to authorize the transaction, deny the transaction, or request secondary authentication of the user 122 based on the distance between the location of the transaction and the user computing device 124 as described herein.

In regard to secondary or additional authentication requests, each transaction rule may include stored additional authentication information required for the additional authentication request to be verified (e.g., cell phone number of the user 122, the email of the user 122, information of the user 122, the personal identification number (PIN) of the user 122, the date of birth of the user 122, device button pattern of the user computing device 124, voice authentication of the user 122, etc.) which may be specified by the user 122 as well as a recipient address to which the request is provided (e.g., email, phone number, IP address, etc.). In one example, the additional authentication request may require the user 122 to press buttons on the user computing device 124 in a specific sequence (e.g., button on the back of the user computing device 124 then button on the side of the user computing device 124, twice) within a specified period of time.

The user 122 may provide the one or more transaction rules to the provider institution computing system 102 via the user computing device 124 or via one or more of the devices from which the provider institution computing system 102 received information relating to in step 204(e.g., mobile application 137). In one example, the user 122 may provide information for the mobile application 137 to generate the transaction rules, define the first distance range, the second distance range, the location based authentication requirement, and the optional third distance ranges. The transaction rules, once generated, may be provided to the provider institution computing system 102 over the network 121 and stored within the rules database 118 in relation the account of the user 122 to which they are associated.

In some embodiments, the user 122 may provide, via the mobile application 137, multiple transaction rules for the account of the user 122 such that each transaction rule needs to be met for the provider institution computing system 102 to authorize a single transaction. In this way, the user 122 may set a first transaction rule for the user computing device 124 and a second transaction rule for another user computing device 124. As a result, the user 122 may have higher level authentication for one device than another (e.g., a smart watch versus a smartphone). In even other embodiments, each transaction rule may relate to multiple devices (e.g., the one or more user computing devices 124) such that any one of the user computing devices 124 must be within a specific distance range for the transaction to be authenticated. In this way, if the user 122 forgets their first user computing device 124 at home, the user 122 may still be authenticated via their second user computing device 124.

Once the one or more transaction rules have been received by the provider institution computing system 102, the method 200 proceeds to step 212 at which a transaction authorization request for a transaction relating to the account of the user 123 is received from a the ATM 143 or the POS computing system 170 by the provider institution computing system 102 (or, from an intermediary as part of the transaction, such as a payment rail computing system). In some embodiments, the request may further include transaction information, payment information, and other information required to process the transaction. The request may include location information of the transaction location (e.g., the location of the ATM 143 or the location of the point of sale computing system 170) such that the provider institution computing system 102 may use the location information to determine if the transaction rules are triggered.

Once the request to authorize a transaction has been received, the method 200 proceeds to step 216 at which the location of the transaction is determined based on the transaction information, the ATM 143, or the point of sale computing system 170. In some embodiments and prior to the step 216, the provider institution computing system 102 may determine if one or more of the location based authentication requirements have been met, activated, or fulfilled based on the request. For example and as described herein, the user 122, via the provider institution computing system 102, may only require location based authentication on transactions over a predefined value (e.g., $100), and so prior to proceeding to the step 216, the provider institution computing system 102 may first determine if the request is for a transaction over the predefined value. In an example where the transaction does not exceed the predefined value, the method 200 may proceed all the way to step 228 and authorize the transaction. In comparison, if the transaction amount exceeds the predefined value, the provider computing system may proceed to the step 216.

To determine the location of the transaction, the provider institution computing system 102 may determine if the request to authorize the transaction includes a location of the transaction, and, if not, request the location of the transaction from the point of sale computing system 170 or the ATM 143. In this regard, the provider institution computing system 102 may require the ATM 143 or the point of sale computing system 170 to provide the location of the transaction or automatically deny the request. In other embodiments, the provider institution computing system 102 may use the IP address of the provider computing system 170 or the ATM 143 to determine the location of the transaction. In situations where there are multiple transaction authentication requests, the provider institution computing system 102 may require a separate location for each transaction or may allow a single transaction location to be used for multiple transactions.

Once the location of the transaction has been determined or received by the provider institution computing system 102, the method 200 proceeds to a step 217 at which the provider institution computing system 102 identifies an identity of the user associated with the transaction request. For example, the provider institution computing system 102 may search the accounts database 116 for a customer that has the same name, account, and/or payment information as identified in the transaction request. In situations where there is no matching customer or user, the transaction may be denied. Alternatively, if the accounts database 116 locates a matching account, the user 122 may be identified by the provider institution computing system 102. Further, the provider institution computing system 102 may then look for or determine any relevant transaction rules within the rules database 118, determine if any location based authentication requirements are met, etc.

Once the identity of the user associated with the transaction is determined, the method 200 may proceed to step 218. At process 218, a computing device associated with the identified user is determined. For example, the provider institution computing system 102 may look at transaction rules within the rules database 118 and determine that the identified user (e.g., the user 122) has one or more transaction rules associated with the user computing device 124. While the user may have multiple devices stored in the accounts database 116, the user computing device 124 may be selected by cross-referencing the identity of the user and the transaction rules. In some embodiments, more than one of the user computing device 124 may be selected at step 218 such that the each of the user computing devices 124 must be used in the subsequent steps.

Once the computing device(s) associated with the identified user are determined, the method 200 proceeds to step 220 at which the location of the one or more determined computing devices is determined or received based on the transaction rules. In some embodiments and prior to step 220, the provider institution computing system 102 may first determine if the transaction location is within or outside of a geofence based on a geofence requirement. In some embodiments, the provider institution computing system 102 may be configured to automatically authorize (assuming the account of the user 122 has enough funds) transactions within the geofence or automatically deny transaction within the geofence (depending on the transaction rule). Therefore, if the provider institution computing system 102 determines that the transaction location is within the geofence, the provider institution computing system 102 may deny or authorize the transaction (depending on the transaction rule). In other embodiments, the provider institution computing system 102 may automatically authorize transactions within the geofence and require location based authentication outside of the geofence (or vice versa). In this way, the provider institution computing system 102 may determine that the transaction is outside (or inside) of the geofence and proceed to step 220. In other embodiments, the transaction rule may not have any geofence requirement and the provider computing system may proceed directly from step 216 to step 220.

To determine the location of the determined computing devices of the identified user (e.g., the user computing device 124 of the user 122), the provider institution computing system 102 may communicate with the user computing device 124 over the network and request the location of the device. In other embodiments, the provider institution computing system 102 may communicate with the location sensor 130 directly to request the location of the user computing device 124. In some embodiments, the provider institution computing system 102 may interface or communicate with the user computing device 124 via the mobile application 137 and request the location of the device via the application 137. In other embodiments, the user 122 may be requested to provide the location of the user computing device 124 (e.g., via the mobile application 137, via a short message service (SMS) or text message and response via the input/output circuit 132, via email, etc.). In some embodiments, the provider institution computing system 102 may determine the location of the user computing device 124 by other means (e.g., cell tower triangulation, the IP address of the device, the network address of the device, etc.). In even other embodiments, the provider institution computing system 102 may use a previously determined location of the user computing device 124 assuming it is recent enough (e.g., within a predefined time limit (e.g., 5 minutes, 10 minutes, etc.)). In further embodiments, the provider institution computing system 102 may track the location of the user computing device 124 such that the general direction or location of the user 122 indicates that the user 122 could not have performed a transaction at the transaction location.

Once the location of the one or more determined computing devices (e.g., the user computing device 124) has been determined based on the transaction rule, the method 200 proceeds to step 224. At process 224, the provider institution computing system determines if the transaction rule is fulfilled based on the distance between the location of the one or more mobile computing devices and the location of the transaction. For example and at step 224, the provider institution computing system 102 may determine the distance between the transaction (based on the transaction location) and the user computing device 124 (based on the user computing device 124 location). To do so, the provider institution computing system 102 may transform each distance into a coordinate and then calculate the distance based on the coordinates (e.g., using the "haversine" formula or other common latitude/longitude distance formulas). Once the distance between the user computing device 124 and the transaction is determined, the provider institution computing system 102 may determine if the distance falls in the first distance range, the second distance range, or the third distance range to determine if the transaction rule is fulfilled such that the transaction can be authenticated and authorized. In some embodiments, if the determined distance falls within the first distance range, the transaction rule is fulfilled. In other embodiments, if the determined distance falls in the second distance range or the third distance range, the transaction rule is not fulfilled.

If the provider institution computing system 102 determines that the one or more transaction rules have been fulfilled based on the location of the one or more mobile computing devices, the location of the transaction, and the transaction rules(s) at the step 224, the method 200 may proceed to the step 228. At step 228, the transaction is authenticated as being performed by the user 122 and authorized by the provider institution computing system 102.

If the provider institution computing system 102 determines that the one or more transaction rules have not been fulfilled based on the location of the one or more mobile computing devices, the location of the transaction, and the transaction rules(s) at the step 224, the method 200 proceeds to step 232. At process 232, the provider institution computing system 102 determines if additional authentication is required. For example, the provider institution computing system 102 may determine that the distance between the user computing device 124 and the determined transaction location falls within the third range of distances such that additional authentication is required before the transaction can be authorized. In other embodiments, the provider institution computing system 102 may determine that the distance between the user computing device 124 and the transaction location falls within the second range of distances such that secondary authentication is not required and that the transaction is not authorized.

If the provider institution computing system 102 determines that the transaction is not authorized and that additional authentication is not required, the method 200 proceeds to step 236. At step 236, the provider institution computing system 102 denies the transaction. In some embodiments at or after the step 236, the provider institution computing system 102 may transmit or provide an indication that the transaction request is denied to the point of sale computing system 170. In this way, the person attempting to make a purchase at the point of sale computing system 170 may be provided an indication that the transaction has been denied. In other embodiments, the provider institution computing system 102 may mark the transaction as potential fraud such that the user 122 is provided with a notification of potential fraud. As a result, the user 122 may take action with their account to determine if it was actual fraud or if it was the user 122 attempting to make the purchase.

If the provider institution computing system 102 determines that additional authentication is required based on the location of the one or more mobile computing devices, the location of the transaction relative to the transaction rules, the method 200 proceed to step 238. At step 238, the provider institution computing system 102 performs additional authentication. Method 300 (FIG. 3) describes performing additional authentication. The provider institution computing system 102 may perform the additional authentication as selected or set by the user 122 and approve, deny, or perform more additional authentication to authenticate and authorize or deny the transaction. As a result, once the additional authentication has been performed the method 200 proceeds to step 240 at which the provider institution computing system 102 determines if the transaction rules are fulfilled based on the additional authentication, and possibly on the previously relied on information. In one example, the user 122 may set that if the location between the transaction and the user computing device 124 is over a predefined distance, the user 122 must be provided an additional authentication request (e.g., an SMS/text message), via the recipient address (e.g., their cellphone number), and reply with a predefined reply (e.g., "Okay") within a predefined time period from the transaction for the transaction to be authenticated. Therefore, if the distance between the transaction and the user computing device 124 is determined to be over the predefined distance, the provider institution computing system 102 may provide the user 122 an additional authentication request (e.g., a text message) (at the recipient address) that requests additional authentication. If the user 122 replies the predefined reply (e.g., "Okay") within the predefined time period, the transaction may be authorized based on the additional authentication (the response) and the transaction rules. If the user 122 does not reply the predefined reply (e.g., "Okay") within the predefined time period, the transaction may be originally pre-authorized (e.g., allowed to be processed at the ATM 143 or the point of sale computing system 170), but may then be denied and marked as fraud such that the ATM 143, the point of sale computing system 170, or the provider institution computing system 102 may need to take action (e.g., contact the authorities, etc.).

Similarly, if the transaction rules are fulfilled based on the additional authentication information, the method 200 proceeds to the step 228. At process 228, the provider institution computing system 102 authenticates and authorizes the transaction. In contrast, if the transaction rules are not fulfilled based on the additional authentication information, the method 200 proceeds to the step 236 at which the transaction is denied. In some embodiments, the transaction may be pre-authorized/authenticated and then later reported as fraud at step 236. In this way, the user 122 is not prevented from completing a purchase, but if it is later discovered that the purchaser was not the user 122, the transaction will be reported as fraudulent.

Figure 3:
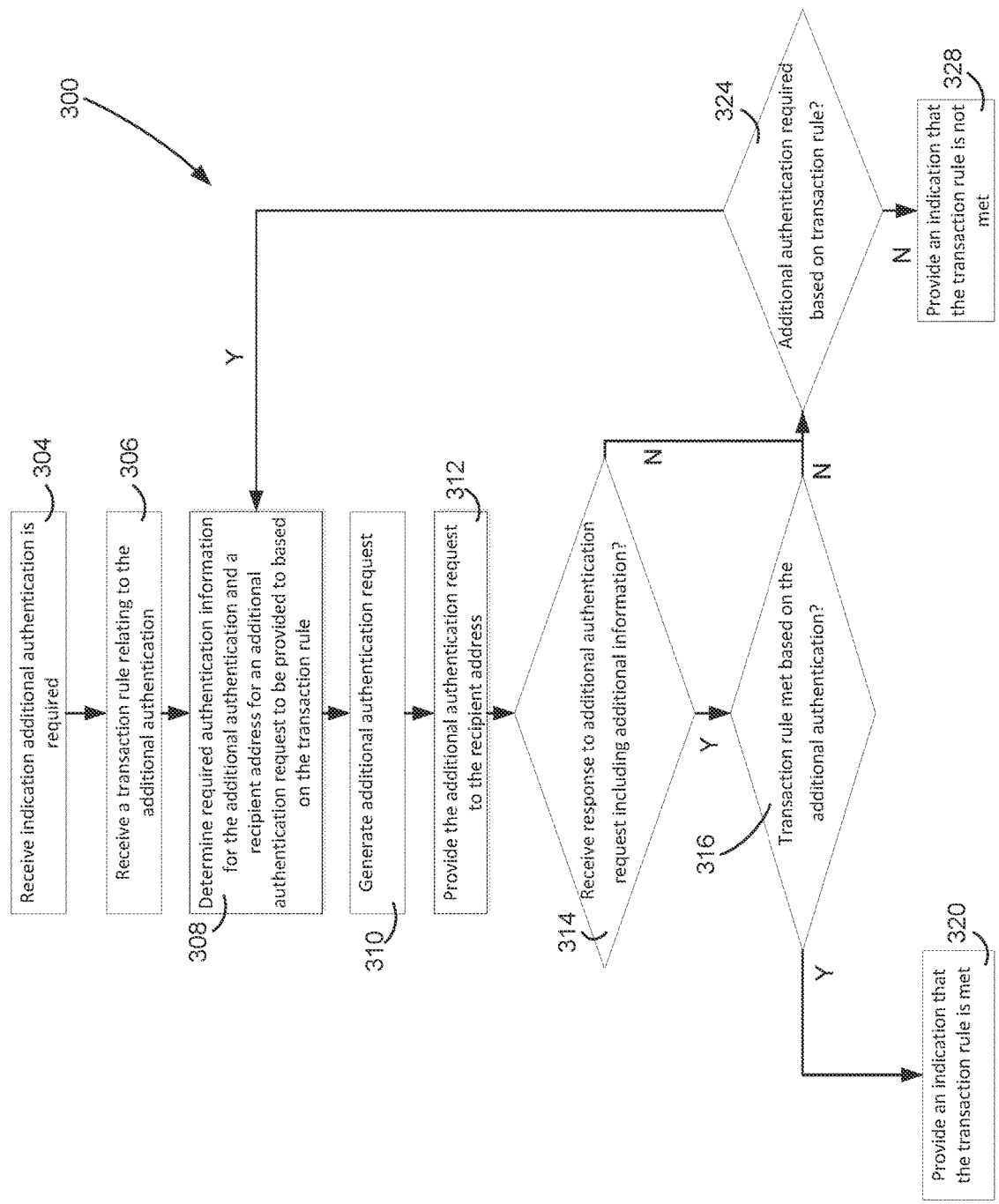
FIG. 3 is a flow diagram of a method for performing additional authentication in combination with the location based transaction authentication of FIG. 2, according to an example embodiment.

Referring now to FIG. 3, a flow diagram of method 300 for performing additional authentication is shown, according to an example embodiment. Operations of the method 300 may be performed by the location based transaction authentication computing system 100 (e.g., the processor 112 of the provider institution computing system 102). Through the steps of the method 300, the provider institution computing system 102 performs additional authentication to determine if a transaction is authorized based on the transaction rules within the rules database 118. In one example, the provider institution computing system 102 may determine that additional authentication is required as discussed above. The provider institution computing system 102 may then determine the type of additional authentication required and authenticate or deny the transaction based on the results of the additional authentication.

The method 300 commences at step 304 in which an indication that additional authentication is required is received by the provider computing system 102. For example, step 304 may commence after step 232 of method 200 in which the provider institution computing system 102 determines that additional authentication is required.

Once the indication that additional authentication is required is received by the provider institution computing system 102, the method 300 proceeds to step 306 at which one or more transaction rules relating to the additional authentication are received by the provider computing system 102. For example, the one or more transaction rules may be received by the rules database 118 from the user computing device 124 (e.g., from the mobile application 137).

Based on requiring additional authentication, at step 308, one or more pieces of additional authentication information that are required and a recipient address for an additional authentication request are determined. As mentioned above, the "recipient address" refers to refers to a physical or digital location to which the additional authentication request may be sent. Based on the transaction rule(s), the provider computing system 102 may determine that the authentication information includes one or more of a response from the user, an input of a date of birth of the user, biometric information regarding the user (e.g., face identification, fingerprint scan, etc.), an answer to a challenge question, a PIN, etc. The provider institution computing device 102 may provide the prompt for this additional authentication information to the recipient address, which is end point recipient for the prompt. Accordingly, the recipient address may include a prompt within the mobile application 137, a prompt from a display screen of the point of sale computing system, and/or a prompt from a display screen of the ATM. As discussed herein, when the user 122 provides information to the provider institution computing system 102, the provider institution computing system 102 generates the one or more transaction rules and stores the particular additional authentication information required for the additional authentication in certain situations as well as the designated recipient address for those situations. In other embodiments, the recipient address may be an digital location (e.g., an IP address) of at least one of the provider computing system 170 or the ATM 140 through which the additional authentication request may be sent. The response may then be provided by the user 122 directly at the POS computing system 170 or the ATM 140 (e.g., via the input/output circuits 152, 178), or an operator of the POS computing system 170 or the ATM 140.

Based on determining the required additional authentication information and the recipient address, at step 310, the additional authentication request is generated by the provider computing system 102. The authentication request may be generated by the provider institution computing system 102. In other embodiments, the request may be generated by the device through which the request is prompted. For example, if the recipient address is the mobile application 137, the request may be generated by the mobile application 137.

Based on the additional authentication request being generated, the method 300 proceeds to step 312 at which the request is provided to the recipient address 312 by the provider computing system 102. In some embodiments as described herein, the step 312 may be combined with step 310 (e.g., the request may be generated and provided in the same step). In other embodiments, the provider institution computing system 102 may generate the request at step 310 and then send the request out at the step 312 to the recipient address (e.g., over the network 121). In some embodiments, the provider institution computing system 102 may further require an indication (e.g., a read receipt) that the request was received or may repeatedly attempt to send the request until the provider institution computing system 102 receives such an indication. The request may be provided in a variety of ways (e.g., text message, phone call, email, etc.) which may be based on the recipient address itself. In other embodiments, the request may be provided in multiple different ways based on a single recipient address (e.g., a phone call or a text message to a phone number, etc.).

Based on the additional authentication information request being generated and provided to the recipient address by the provider institution computing system 102, the method 300 proceeds to step 314 at which it is determined if a response to the additional authentication request including additional information has been received by the provider institution computing system 102. For example, the provider institution computing system 102 may receive a response at step 314 that includes a message (e.g., additional information). In another example, a specified period of time may lapse (e.g., 30 minutes) at step 314 and the provider institution computing system 102 may determine that no response has been received. In other embodiments, the transaction may be pre-processed at step 314 such that the transaction is allowed to take place at the point of sale computing system 170 or the ATM 143. Then, if no response is received or if a response is not received within the specified period of time, the provider institution computing system 102 may report the transaction as fraudulent and notify the user 122 of such. In other embodiments, if the response is received within the pre-defined/specified period of time, the provider computing system 102 may fully authorize the transaction and notify the user 122 of such. In some embodiments, a response that includes no information (e.g., an empty text message, empty email, etc.) may also be considered as no response having been received by the provider institution computing system 102.

Based on the response to the authentication request being received by the provider institution computing system 102, the method 300 may proceed to a step 316 at which it is determined if the transaction rules are met based on the additional information and the stored additional authentication information by the provider institution computing system 102. For example and at the step 316, the provider institution computing system 102 may compare the additional information received within the response at the step 314 with the additional authentication information required determined at step 308. In some embodiments, if the information matches or is "close enough" it may deemed that the user 122 is authenticated by the provider institution computing system 102. For example "close enough" may be determined by removing or modifying characters such as removing space and punctuation characters or lowercasing all characters. For example, if the required information is a response that includes a predefined response with a single uppercase letter (e.g., "Okay,"), the same predefined response with all lowercase letters (e.g., "okay") may be determined to match the predefined response after turning all characters to lowercase by the provider institution computing system 102. Similarly, this determination may be based on the transaction rule such that all processing of the received information by the provider institution computing system 102 and the additional authentication information is based on the transaction rule itself.

Based on the transaction rules being met by the additional authentication, the method 300 may proceed to a step 320 at which an indication is provided by the provider institution computing system 102 that the transaction rules are met. In other embodiments, the transaction itself may be authorized and authenticated at step 320 such that the transaction can take place. In contrast, if is determined that the transaction rules are not met based on the additional authentication (at step 316) or that no response was received to the additional authentication request (at step 314), the method 300 may proceed to a step 324 at which it is determined if further additional authentication is required by the provider institution computing system 102. For example, the user 122 may have an authentication rule to send them a request to a first recipient address (e.g., the email of the user 122) requesting additional authentication information (e.g., the date of birth of the user), but if they do not respond, to send them a second request at a second recipient address (e.g., the phone number of the user 122) requesting the same additional authentication information.

Based on additional authentication information being required by the provider institution computing system 102, the method 300 may return to the step 308 and repeat the steps 308-316. If no additional authentication is determined to be required at step 320, the method 300 may proceed to a step 328 at which an indication that the transaction rules are not met is provided. In other embodiments, the transaction authorization request may be denied by the provider institution computing system 102 at step 328 such that the transaction cannot take place.

Figure 4:
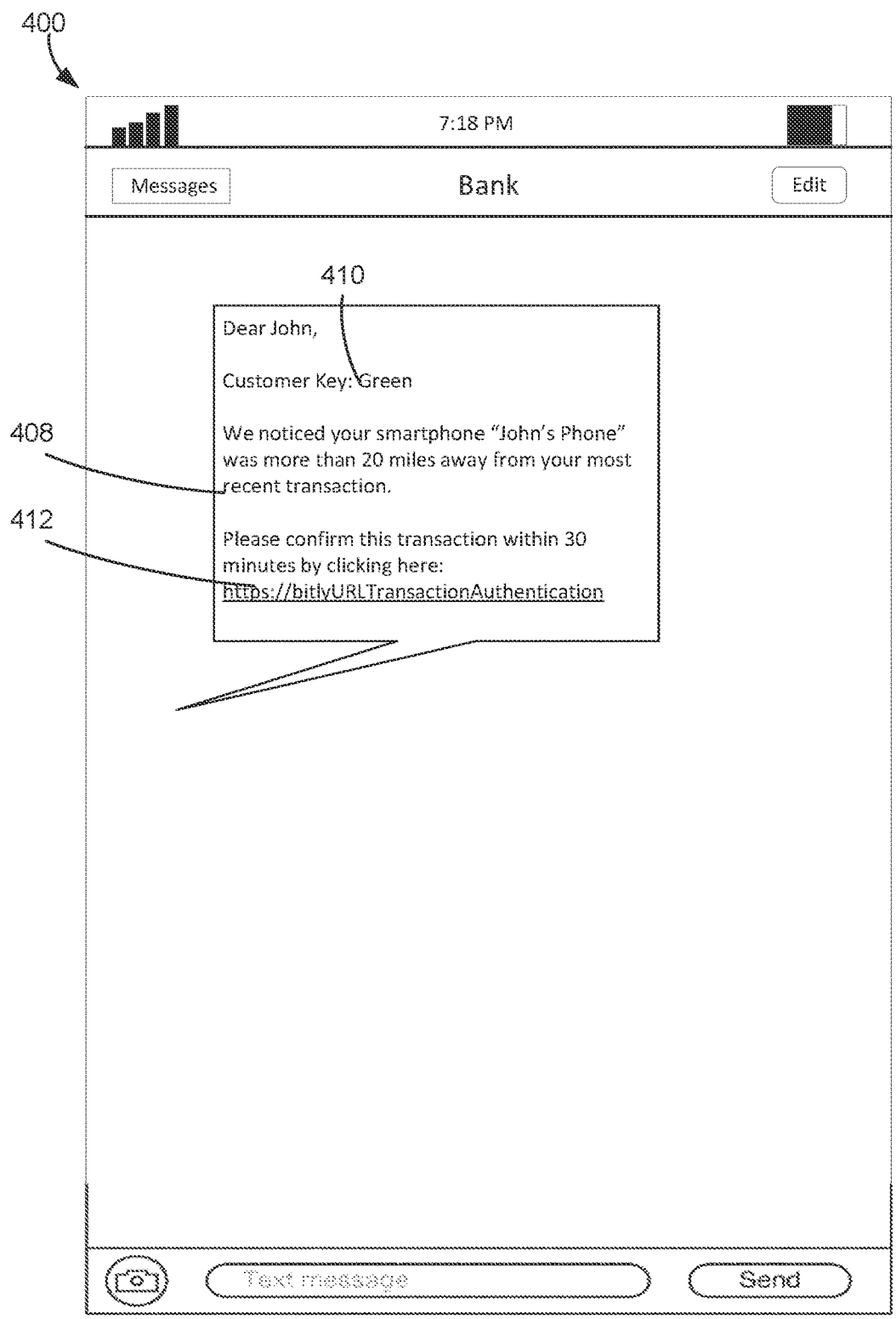
FIG. 4 is an illustration of a user interface of an additional authentication request that is provided to a user as part of the methods of FIGS. 2 and 3, according an example embodiment.

Referring now to FIG. 4, an illustration of a user interface 400 is shown, according to an example embodiment. The user interface 400 may be generated by the provider institution computing system 102, provided to the user computing device 124, (e.g., via the mobile application 137), and presented to the user 122 in combination with the methods 200 and 300. For example, at step 310 when the additional authentication request is generated, an additional authentication request 408 may be generated. Alternatively, the user interface 400 may be generated by the mobile application 137 directly. As shown, the additional authentication request 408 includes a personal identifier 410 and the information relating to the required additional authentication information (e.g., selection of a link 412). As described herein, the "personal identifier" may be a phrase of words, passcode, grouping of characters or numbers that the user 122 identifies as only known by the provider institution 101 and used to identify the user. The personal identifier 410 may therefore be included within the additional authentication request 408 to verify that the sender of the request is the provider institution 101. In this way, the personal identifier 410 may be set by the user 122 prior to or during the setting up of their bank account. As a result, when the user 122 receives the additional authentication request 408 they know that the request 408 is valid due to the personal identifier 410. The additional authentication request 408 may be provided to the user 122 via the display of the user computing device 124 such that the user can provide additional information by clinking the link 412. In some embodiments, the link 412 may include a uniform resource locator (URL) with an expiration parameter such that after a specified period of time (e.g., 30 minutes) the URL is no longer active and does not work. In other embodiments, if the link 412 is selected within the specified period of time, the user 122 may provide additional authentication such that their transaction may be authenticated and authorized (see FIG. 3).

Figure 5:
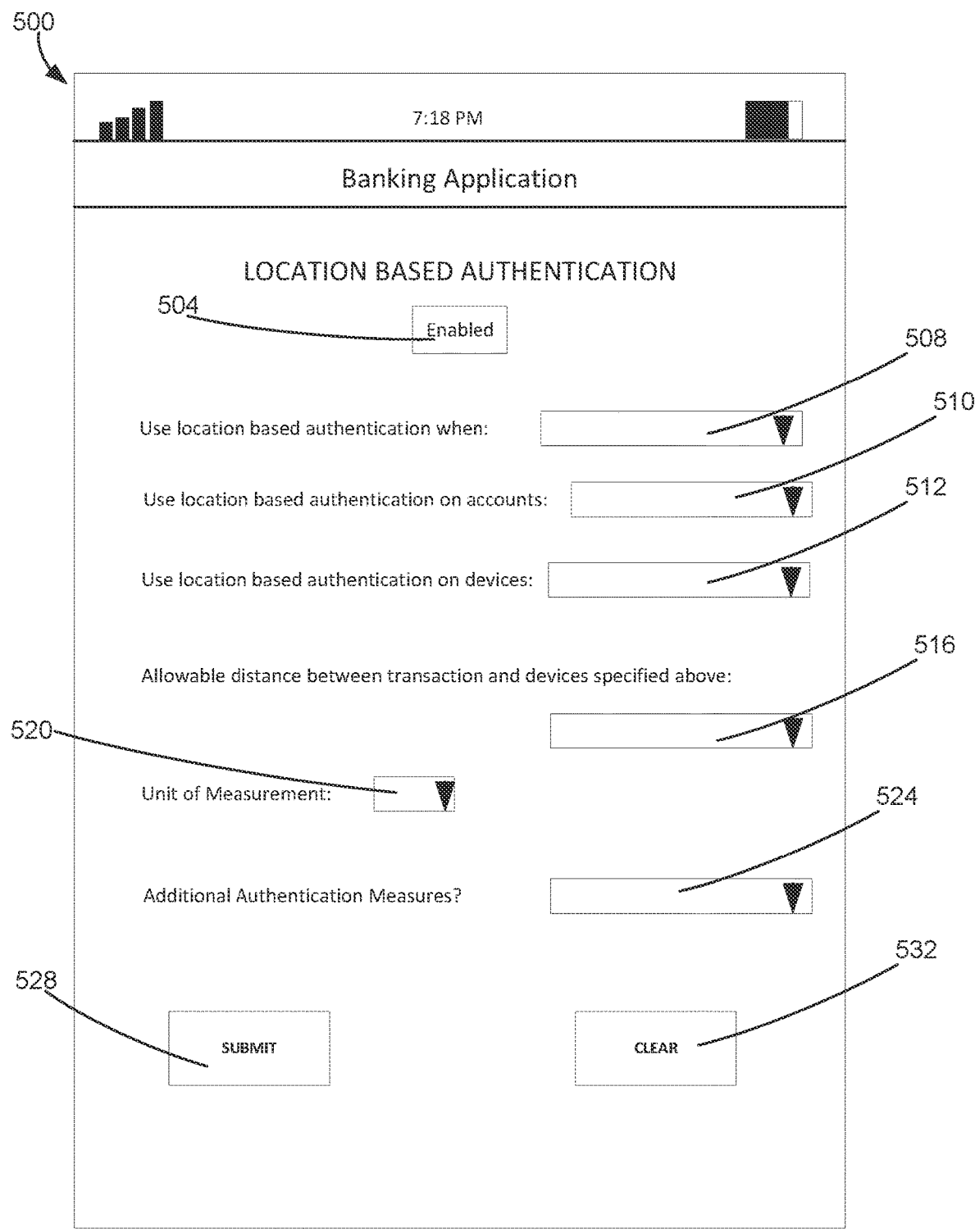
FIG. 5 is an illustration of a user interface that may be presented the user as part of the methods of FIGS. 2 and 3, according an example embodiment.

Referring now to FIG. 5, an illustration of a user interface 500 is shown, according to an example embodiment. The user interface 500 may be generated by the provider institution computing system 102, provided to the user computing device 124 (e.g., via the mobile application 137), and presented to the user 122 in combination with the methods 200 and 300. In the example as shown, the user interface 400 may be generated by the mobile application 137 directly. For example, at step 208 when the transaction rule is received by the provider institution computing system 102, the transaction rule may first be received by the user interface 500 of the mobile application 137 and then provided to the provider institution computing system 102. Additionally, the user interface 500 of the mobile application 137 may allow the user 122 to customize their transaction rules and to also activate location based authentication such that the user computing device 124 provides the customized rules and indicates that the provider institution computing system 102 should activate location based transaction authentication. To do so, the user interface 500 may include a location based authentication indicator 504, a requirement drop down box 508, an account selection drop down box 510, a device selection drop down box 512, a range selector drop down box 516, a secondary range selector drop down box 520, an additional authentication drop down box 524, a submit button 528, and a clear button 532. The indicator 504 may be presented via the user interface 500 to inform the user 122 if location based authentication is active or not. For example, the indicator may be regularly updated (e.g., every minute) and provide the status (e.g., "active", "enabled", "off") of location based authentication on the device that generated the user interface 500. In this way, the indicator 504 and the user interface may be device specific.

The requirement drop down box 508 may be a clickable or selectable box that when selected by the user 122 drops down location based authentication transaction requirement options to trigger or activate the location based authentication as described herein. For example, if the requirement drop down box 508 is selected options such as "Amount", "Geofence", "Time Range", may appear. Additionally, the user 122 may be able to select multiple options such that multiple requirements can be added to the transaction rule. Additionally, when selected, each option may generate or include a range text box into which the user 122 can enter their transaction requirements. For example, if the user 122 selects "Amount" a text may appear that allows the user 122 to enter a custom amount range (e.g., >=$1,000) that the transaction is required to meet for location based authentication to be active. Similarly, the account selection drop down box 510 may be a selectable box that when selected provides one or more account options of the user 122 to allow selection of an account to use with the location based authentication described herein (e.g., checking account, savings account, etc.). Accordingly, the user 122 may then select an account to use with a transaction rule. The device selector drop down box 512 allows the user to select the devices associated with various transaction rules. The range selector drop down box 516 and the secondary range selector drop down box 520 allows the user 122 to select the first, second, or third distance range as discussed herein. Lastly, the additional authentication drop down box 524 may allow the user to set the additional authentication measures (e.g., information required and recipient address) as described herein.

The submit button 528 is a selectable or clickable button that allows the user 122 to submit their options for the mobile application 137 and/or provider institution computing system 102 to generate the transaction rule. For example, the if the user 122 selects the submit button 528 the transaction rule may be generated by the mobile application 137, provided to the provider institution computing system 102, and stored within the rules database 118. In some embodiments, each of the fields (all of the drop down boxes) must be filled out before the submit button 528 will generate a rule when selected (e.g., the button 528 will display an indication to the user 122 to fill out the rest of the fields). In other embodiments, only some of the fields must be filled out before the submit button 528 will generate a rule when selected. Similarly, the clear button 532 is a clickable button that when selected clears all of the fields of the user interface 500. In some embodiments, the clear button 532 also refreshes the user interface 500 such that all of the drop down boxes and the indicator 504 are updated and received new information.

The embodiments described herein have been described with reference to drawings.

The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOC) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring, and so on.

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system) or remotely (e.g., as part of a remote server such as a cloud based server). To that end, a "circuit" as described herein may include components that are distributed across one or more locations.

An exemplary system for implementing the overall system or portions of the embodiments might include a general purpose computing devices in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and embodiment of the embodiments without departing from the scope of the present disclosure as expressed in the appended claims.

What is claimed is:

1. A computer implemented method for authorizing a transaction, comprising:
   receiving, by a provider institution computing system, a transaction authorization request for a transaction from a point of sale computing system, the transaction authorization request including transaction information and information identifying an account of a user;
   determining, by the provider institution computing system, a location of the transaction based on at least one of the transaction information or the point of sale computing system;
   identifying, by the provider institution computing system and based on the information identifying the account of the user, an identity of the user associated with the transaction authorization request;
   determining, by the provider institution computing system, a computing device associated with the identified user based on cross-referencing the identity of the user to one or more computing devices associated with the identified user;
   identifying, by the provider institution computing system and based on the account of the user and the computing device, a transaction rule associated with the account of the user, the computing device, and the identified user, the transaction rule designating an authorization distance and an authentication distance;
   based on determining the computing device, determining, by the provider institution computing system, a location of the determined computing device associated with the identified user;
   determining, by the provider institution computing system, a distance between the location of the transaction and the location of the determined computing device;
   determining, by the provider institution computing system, that additional authentication is required of the identified user based on the determined distance relative to the authentication distance such that (i) in response to the determined distance being greater than the authorization distance but less than or equal to the authentication distance, the required additional authentication includes a first set of authentication information, and (ii) in response to the determined distance being greater than the authentication distance, the required additional authentication includes a second set of authentication information different from the first set of authentication information;
   prompting, by the provider institution computing system, the identified user for additional authentication information from at least one of the point of sale computing system or the determined computing device;
   receiving, by the provider institution computing system, a response including additional information from the at least one of the point of sale computing system or the determined computing device; and
   authorizing, by the provider institution computing system, the transaction based on the additional information matching stored additional authentication information.

2. The method of claim 1, wherein the identified user is prompted for the additional authentication information from the determined computing device, and wherein the additional authentication information includes at least one of a specific order of pressing one or more buttons of the determined computing device, a date of birth of the identified user, a text reply, biometric information, or a personal identification number.

3. The method of claim 1, wherein the identified user is prompted for the additional authentication information from the point of sale computing system, and wherein the additional authentication information is at least one of a date of birth of the identified user, a personal identification number, or a phone number of the identified user.

4. The method of claim 1, wherein determining the location of the transaction comprises:
   requesting, by the provider institution computing system, an internet protocol (IP) address of the point of sale computing system;
   receiving, by the provider institution computing system, the IP address of the point of sale computing system from the point of sale computing system; and
   determining, by the provider institution computing system, the location of the transaction from the IP address.

5. The method of claim 1, wherein determining the location of the determined computing device comprises:
   requesting, by the provider institution computing system, permission via the determined computing device to access the location of the determined computing device;

receiving, by the provider institution computing system, the permission to access the location of the determined computing device; and requesting and receiving, by the provider institution computing system, the location of the determined computing device from the determined computing device based on the permission.

6. The method of claim 1, wherein the transaction rule further designates a reference location and a geofence distance, and wherein the method further comprises:

determining, by the provider institution computing system, that the additional authentication information is required based on a distance between the reference location and the location of the determined computing device being greater than or equal to the geofence distance.

7. A location based transaction authentication computing system, comprising:

a network interface structured to facilitate data communication with a point of sale computing system and a computing device via a network; and a processing circuit comprising a processor and a memory, the processing circuit structured to:

receive, via the network interface, a transaction authorization request for a transaction from the point of sale computing system, the transaction authorization request including transaction information and information identifying an account of a user;

determine a location of the transaction based on at least one of the transaction information or the point of sale computing system;

identify, based on the information identifying the account of the user, an identity of the user associated with the transaction authorization request;

determine the computing device is associated with the identified user based on cross-referencing the identity of the user to one or more computing devices associated with the identified user;

identify, based on the account of the user and the computing device, a transaction rule associated with the account of the user, the computing device, and the identified user, the transaction rule designating an authorization distance and an authentication distance;

based on determining the computing device, determine a location of the determined computing device associated with the identified user;

determine a distance between the location of the transaction and the location of the determined computing device;

determine that additional authentication is required of the identified user based on the determined distance relative to the authentication distance such that (i) in response to the determined distance being greater than the authorization distance but less than or equal to the authentication distance, the required additional authentication includes a first set of authentication information, and (ii) in response to the determined distance being greater than the authentication distance, the required additional authentication includes a second set of authentication information different from the first set of authentication information;

prompt the identified user for additional authentication information from at least one of the point of sale computing system or the determined computing device;

receive a response including additional information from the at least one of the point of sale computing system or the determined computing device; and authorize the transaction based on the additional information matching stored additional authentication information.

8. The location based transaction authentication computing system of claim 7, wherein the processing circuit is further structured to:

based on the additional information not being received within a predefined period of time, designate the transaction as fraudulent; and in response to the transaction being designated as fraudulent, provide a notification to the determined computing device indicating that the transaction has been designated fraudulent.

9. The location based transaction authentication computing system of claim 7, wherein the processing circuit is further structured to prompt the user for the additional authentication information from the determined computing device by:

generate and provide a notification to a mobile provider institution client application, the notification requesting the additional authentication information from the user.

10. The location based transaction authentication computing system of claim 9, wherein the additional information is received from the mobile provider institution client application of the determined computing device.

11. The location based transaction authentication computing system of claim 7, wherein the additional authentication information includes at least one of a specific order of pressing one or more buttons of the determined computing device, a date of birth of the identified user, a text reply, biometric information, or a personal identification number.

12. The location based transaction authentication computing system of claim 7, wherein the processing circuit is structured to determine the location of the transaction by:

request an internet protocol (IP) address of the point of sale computing system;

receive the IP address of the point of sale computing system from the point of sale computing system; and determine the location of the transaction from the IP address.

13. The location based transaction authentication computing system of claim 7, wherein the processing circuit is structured to determine the location of the determined computing device by:

request a permission via the determined computing device to access the location of the determined computing device;

receive the permission to access the location of the determined computing device; and request and receive the location of the determined computing device from the determined computing device based on the permission.

14. A non-transitory computer readable medium having computer-executable instructions embodied therein that, when executed by at least one processor of a computing system, cause the computing system to perform operations to authorize a transaction, the operations comprising:

receiving a transaction authorization request for a transaction from a point of sale computing system, the transaction authorization request including transaction information and information identifying an account of a user;

determining a location of the transaction based on at least one of the transaction information or the point of sale computing system;

identifying based on the information identifying the account of the user an identity of the user associated with the transaction authorization request;

determining a computing device associated with the identified user based on cross-referencing the identity of the user to one or more computing devices linked to the identified user;

identifying, based on the account of the user and the computing device, a transaction rule associated with the account of the user, the computing device, and the identified user, the transaction rule designating an authorization distance and an authentication distance;

based on determining the computing device, determining a location of the determined computing device associated with the identified user;

determining a distance between the location of the transaction and the location of the determined computing device, determining that additional authentication is required of the identified user based on the determined distance relative to the authentication distance such that (i) in response to the determined distance being greater than the authorization distance but less than or equal to the authentication distance, the required additional authentication includes a first set of authentication information, and (ii) in response to the determined distance being greater than the authentication distance, the required additional authentication includes a second set of authentication information different from the first set of authentication information;

prompting the identified user for additional authentication information from at least one of the point of sale computing system or the determined computing device;

receiving a response including additional information from the at least one of the point of sale computing system or the determined computing device; and authorizing the transaction based on the additional information matching stored additional authentication information.

15. The non-transitory computer readable medium of claim 14, wherein the identified user is prompted for the additional authentication information from the determined computing device, and wherein the additional authentication information includes at least one of a specific order of pressing one or more buttons of the determined computing device, a date of birth of the identified user, a text reply, biometric information, or a personal identification number.

16. The non-transitory computer readable medium of claim 14, wherein the identified user is prompted for the additional authentication information from the point of sale computing system, and wherein the additional authentication information is at least one of a date of birth of the identified user, a personal identification number, or a phone number of the identified user.

17. The non-transitory computer readable medium of claim 14, wherein determining the location of the transaction comprises:
   requesting an internet protocol (IP) address of the point of sale computing system;
   receiving the IP address of the point of sale computing system from the point of sale computing system; and
   determining the location of the transaction from the IP address.

18. The non-transitory computer readable medium of claim 17, wherein determining the location of the determined computing device comprises:
   requesting a permission via the determined computing device to access the location of the determined computing device;
   receiving the permission to access the location of the determined computing device; and
   requesting and receiving the location of the determined computing device from the determined computing device based on the permission.

* * * * *